United States Patent [19]

Koolen

[11] Patent Number: 4,566,807

[45] Date of Patent: Jan. 28, 1986

[54] APPARATUS AND METHOD FOR ACCURATELY MEASURING TEMPERATURES AND TEMPERATURE DIFFERENCES

[75] Inventor: Johannes L. A. Koolen, Terneuzen, Netherlands

[73] Assignee: The Dow Chemical Company, Midland, Mich.

[21] Appl. No.: 578,441

[22] Filed: Feb. 9, 1984

[51] Int. Cl.$^4$ ............................................. G01K 3/00
[52] U.S. Cl. .................................... 374/112; 374/203; 374/143
[58] Field of Search ............... 374/112, 143, 141, 142, 374/113, 201, 202, 203; 73/714, 716

[56] References Cited

U.S. PATENT DOCUMENTS

| 2,536,198 | 1/1951 | Matner et al. | 374/202 |
| 3,994,166 | 11/1976 | Dowen | 73/716 |
| 4,218,925 | 8/1980 | DiDomizio, Jr. | 73/716 |
| 4,329,877 | 5/1982 | Hershey | 73/716 |
| 4,461,180 | 7/1984 | de Menibus | 73/716 |

FOREIGN PATENT DOCUMENTS 1005622 of 1865 United Kingdom ................ 374/203

Primary Examiner—Charles Frankfort
Assistant Examiner—David R. Schuster
Attorney, Agent, or Firm—V. Dean Clausen

[57] ABSTRACT

Disclosed is a differential temperature cell useful for measuring the difference in temperature between two environments. This dT cell comprises a first reservoir which is in fluid communication with a first chamber. Part of one wall of the first chamber defines a diaphragm, which also forms a part of the wall of a second chamber. The diaphragm provides a structure for measuring differences in pressure between the two chambers. The second chamber is also in fluid communication with a second reservoir.

2 Claims, 5 Drawing Figures

APPARATUS AND METHOD FOR ACCURATELY MEASURING TEMPERATURES AND TEMPERATURE DIFFERENCES

The invention relates to a cell and an apparatus for accurately measuring temperature differences between two environments.

Devices are known for measuring vapor pressure differences. Such devices are commonly referred to as differential vapor pressure cells (hereinafter referred to as "dVp cells"). The dVp cells comprise a first chamber containing a reference material at a pressure. The first chamber is in fluid communication with a bulb or reservoir maintained in the environment of interest and containing a vapor in equilibrium with its liquid (i.e., a quantity of liquid insufficient to fill the combination of the bulb or reservoir and the first chamber). A second chamber, separated from the first chamber by a diaphragm, is directly connected and exposed to the medium whose differential vapor pressure is measured with respect to the vapor pressure of the fluid in bulb/chamber combination.

In chemical processes, it is often desirable to accurately measure a relatively small difference in temperature. For example, it is generally desirable for optimum control of a manual or fully automatic process, to establish an accurate heat balance. This requires as accurate a determination as possible of the difference between the temperature of the reaction mixture entering the reactor and the temperature of the reaction mixture leaving the reactor and/or the difference between the temperature of the heat exchange medium applied and the temperature of the heat exchange medium discharged. In many cases, this temperature difference to be measured is only in the order of a few degrees centigrade. Therefore, errors in the measured temperature difference, which in absolute sense, are "small", can be very significant in a relative sense (i.e., as a percentage of the temperature difference), thereby limiting optimum process control. The temperature differences determined by taking the difference between two temperatures measured by means of existing apparatus such as thermistors, thermocouples, resistance temperature detectors and the like have not, in practice, been found to be sufficiently accurate.

Accordingly, in one aspect, the present invention is a differential temperature cell (hereinafter referred to as "dT cell") useful in measuring the difference in temperatures between two environments. The dT cell comprises a first bulb or reservoir being in fluid communication with a first chamber having at least a portion of one wall of a second chamber and a means for measuring the pressure difference between the pressures of the first and second chambers. The second chamber is in fluid communication with a second bulb or reservoir.

In another aspect, the present invention is an apparatus for measuring temperature differences using the dT cell. In a preferred embodiment, the apparatus comprises the dT cell and a means for determining the temperature adjacent or of one of the bulbs or reservoirs, the temperature difference between the fluids in the two bulbs or reservoirs being determinable from the measured pressure difference and the pre-determined temperature.

The invention also provides a method for accurately measuring temperature differences between two environments which method comprises determining the temperature ($T_1$) and pressure ($P_1$) of a first fluid corresponding to the temperature of a first environment and measuring the difference in pressure between the first fluid and a second fluid at a second temperature corresponding to the temperature of a second environment. For example, using the described apparatus, the temperature ($T_1$) and the pressure ($P_1$) of a first fluid contained in the first bulb or reservoir (the temperature of which corresponds to the temperature of a first environment) are determined and the difference in pressure ($\Delta P$) between the first fluid and a second fluid contained in said second bulb or reservoir (the temperature of which corresponds to the temperature of a second environment) are measured. Subsequently, the pressure ($P_2$) of the second fluid is calculated from $P_1$ and the measured pressure difference ($\Delta P$), the temperature ($T_2$) of the second fluid is calculated from the pressure $P_2$ and subsequently the temperature difference ($T_2-T_1$) calculated.

Although various equations relating temperature and pressure can be employed, preferably, the fluid contained by each bulb/chamber combination is a liquid in equilibrium with its vapor and the vapor pressure of a liquid at a certain temperature is interrelated using the formula:

$$\log_{10} P = A - (B/T + C)$$

wherein:
A, B, C are constants,
T = temperature (° C.), and
P = pressure (mm Hg).

It has been found that the apparatus and method according to the invention, as will be described in more detail hereinafter, permits measuring temperature differences in the order of a few degrees centigrade with an accuracy that is 4 to 25 times greater than is possible with prior systems.

The invention will be described in more detail hereinafter with reference to the drawings. In said drawings.

Figure 5:
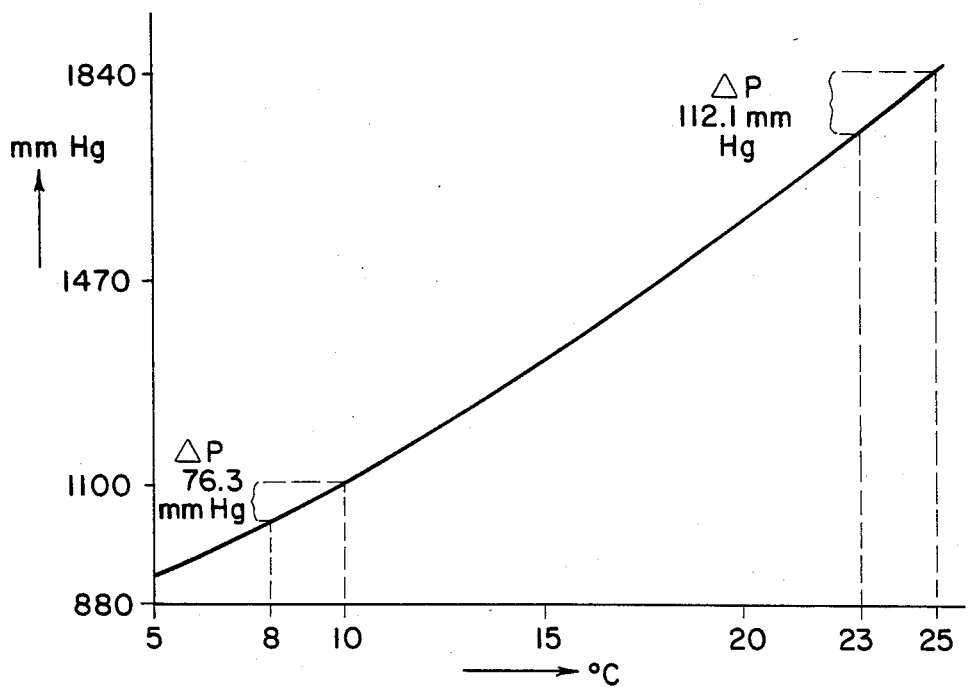

FIG. 5 graphically shows the relation between the temperature and the vapor pressure of n-butane.

Figure 1:
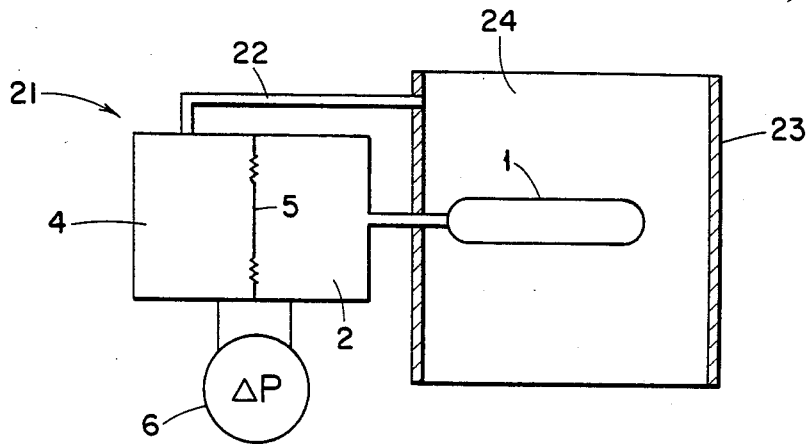
FIG. 1 is a diagrammatic representation of a dVp apparatus of the prior art.

FIG. 1 diagrammatically shows a prior art dVp cell 21 for measuring differences in vapor pressure. In the depicted dVp cell, there is provided a single bulb or reservoir vessel 1, filled with a fluid (preferably, a liquid/vapor), in fluid communication with a first chamber 2. The bulb 1 is disposed within a conduit 23 containing a material 24, the differential vapor pressure of which material is to be measured. One wall of chamber 2 is formed by a diaphragm 5. Disposed at the other side of disphragm 5, is a chamber 4 directly connected by means of a conduit 22 to the interior of conduit 23 containing material or medium 24. A measuring device 6 is capable of determining the difference in pressure of the fluids in chambers 2 and 4. In operation, the difference in the vapor pressure of material 24 between the point where the bulb or reservoir 1 is positioned in conduit 23 and the point where the conduit 22 enters the conduit 23 is determined, with respect to the vapor pressure of the liquid/vapor contained in the combination of bulb and chamber 2, by the differential pressure measurement device 6.

Figure 2:
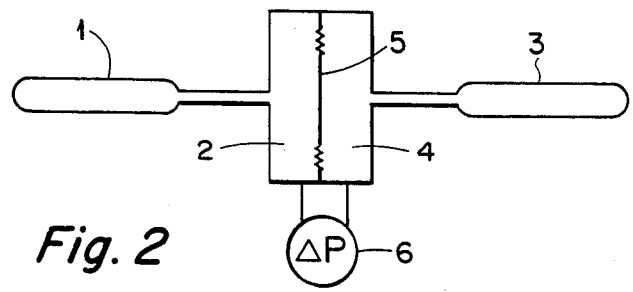
FIG. 2 is a diagrammatic representation of an embodiment of the dT cell of the present invention.

The dT cell of the present invention, as illustrated in FIG. 2, comprises a first bulb or reservoir 1 in fluid communication with a first chamber 2. A diaphragm 5 forms a wall (or at least a portion of a wall) of the first chamber 2 as well as a wall (or at least a portion of a wall) of a second chamber 4. The second chamber 4 is in fluid communication with a second bulb or reservoir 3. Bulbs 1 and 3 contain a fluid, preferably a liquid/vapor combination. A device 6 is capable of measuring the difference in pressure between the fluids contained in chambers 2 and 4.

Figure 3:
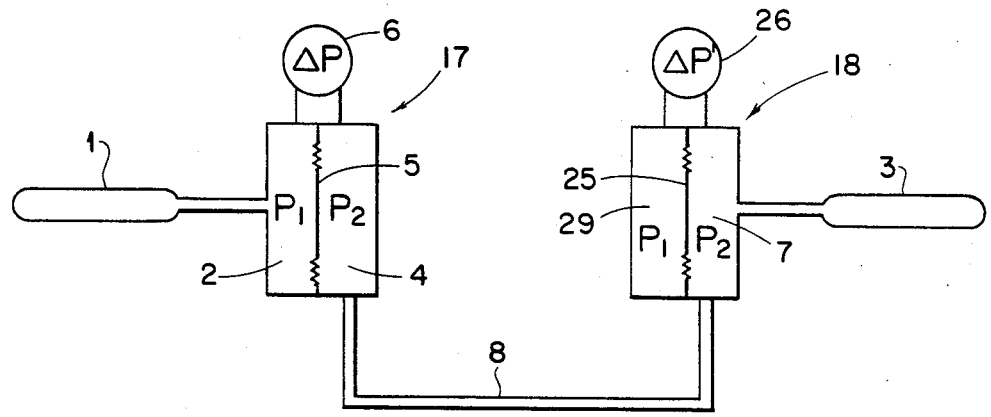
FIG. 3 is a diagrammatic representation of a dT cell of the present invention prepared using two dVp cells.

Alternatively, in order that dVp cells can be employed in the apparatus according to the present invetnion, the dT cell can be prepared as shown in FIG. 3 from two commercial dVp cells. As depicted in the FIG. 3, a first chamber 2 of a first dVp cell 17 is in fluid communication with a bulb or reservoir 1. A second chamber 4 of the first dVp cell 17 is separated from the first chamber 2 by a diaphragm 5. The second chamber 4 is in fluid communication, through a balance line 8, to a first chamber 7 of a second dVp cell 18. The first chamber 7 of cell 18 is divided from a second chamber 29 by a diaphragm 25. A measuring device 6 is suitable for measuring the pressure differences existing in chambers 2 and 4 of the first cell 17. A measuring device 26 (optionally employed) is suitable for measuring the pressure differences existing between chambers 7 and 29 of the second dVp cell 18. In the depicted embodiment, since the pressure chamber 4 of first dVp cell 17 and in chamber 7 of second dVp cell 18 are the same, it is not necessary to connect the second chamber 4 of dVp cell 17 directly to a bulb or reservoir as chamber 7 is in fluid communication with the bulb or reservoir 3.

Figure 4:
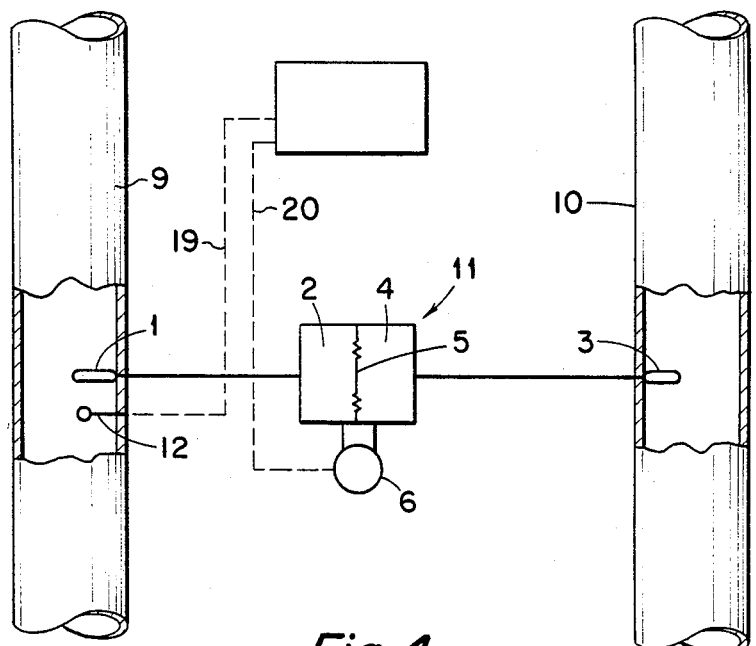
FIG. 4 is a diagrammatic representation of one embodiment of the present invention for use in measuring temperature differences.

The use of the dT cell in measuring temperature differences is explained by reference to FIG. 4, which is a schematic representation, partially in cross-section, of a system comprising the apparatus of the present invention for measuring the temperature difference between the interior of conduit 9 and the interior of conduit 10. Although FIG. 4 depicts the use of the dT cell of FIG. 2 in measuring temperature differences, temperature differences can be determined using the dT cell depicted by FIG. 3 using similar techniques. In said FIG. 4, the bulb 1 which is in fluid communication with first chamber 2 is disposed in the interior of conduit 9 and the bulb 3 which is in fluid communication with second chamber 4 is disposed in the interior of conduit 10. An element 12 capable of measuring temperature is also disposed within conduit 9. For this purpose, any known temperature sensor of sufficient accuracy may be used as the sensor. A computing means 13 is connected to the temperature sensor means 12 by means of lead 19 and to the differential pressure measuring device 6 by means of lead 20.

In the operation of the apparatus depicted in FIG. 4, the fluid in bulb 1 exhibits a pressure ($P_1$) corresponding to the temperature ($T_1$) of the interior of conduit 9 and the fluid in bulb 3 exhibits a pressure ($P_2$) corresponding to the temperature ($T_2$) of the interior of conduit 10. To optimize accuracy, the chambers and the conduit, if any, connecting a chamber with a reservoir of bulb are advantageously insulated to minimize temperature differences between the bulb or reservoir and the chamber to which they are connected. The difference in pressure ($\Delta P$) between $P_1$ and $P_2$ is measured by measuring device 6. The temperature $T_1$) of the interior of conduit 9 is measured by sensor 12. The temperature difference between the interiors of conduits 9 and 10 can then be calculated from $\Delta P$ and $T_1$ by initially calculating pressure $P_1$ of the fluid in chamber 2 from the known temperature $T_1$ using an equation suitably relating temperature and pressure. The pressure $P_2$ of the fluid in the second chamber 4 is then calculated from the calculated $P_1$ and the measured pressure difference, $\Delta P$ using the equation $P_1 + \Delta P = P_2$. The temperature $T_2$ of the fluid in the second chamber 4 which corresponds to the temperature of the interior conduit of 10 is then calculated using an equation suitably relating pressure and temperature. The difference between the temperature of the fluid contained in bulb 1 which corresponds to the temperature of the interior of conduit 9 and the temperature of the fluid contained in bulb 3 which corresponds to the temperature of the interior of conduit 10 can then be calculated.

In actual practice of the embodiment of FIG. 4, a measurable signal, e.g., electrical current, varying with the pressure difference $\Delta P$ is supplied to computing means 13 by means of lead 20. A measurable signal, e.g., electrical current, varying with the temperature measured by sensor 12 is fed to computing means 13 by means of lead 19. From these inputs, computing means 13 determines the difference in temperature between the interiors of conduits 9 and 10.

Alternatively, using the dT cell depicted in FIG. 3, if the pressure exhibited by a fluid contained in the second chamber 29 of dVp cell 18 is known, the temperature difference can also be determined using the following techniques. The absolute vapor pressure ($P_2$) in the first chamber 7 of the second cell 18 is determined from the known pressure ($P_k$) in chamber 29 and the difference in pressure ($\Delta P'$) measured by the pressure measuring device 26 $P_2 = P_k + \Delta P'$. To obtain maximum accuracy, the pressure $P_k$ is preferably within, or as close as possible, to the expected pressure range of $P_2$ to be measured from $P_k$ and $\Delta P$. Subsequently, the temperature ($T_2$) of the fluid contained by the bulb 3 can be calculated using an equation (e.g., Antoine equation) relating temperature and pressure. The pressure ($P_1$) of the fluid contained in chamber 2 of the first cell 17 is then calculated from $P_2$ and the difference in pressure measured by device 6 (i.e., $P_1 = P_2 + \Delta P$). The temperature ($T_1$) of the fluid contained in bulb 1 and chamber 2 is calculated and the difference in temperature calculated (i.e., $\Delta T = T_1 - T_2$).

The relation between the vapor pressure and the temperature for a given liquid is preferably calculated using the Antoine equation:

$$\log_{10} P = A - (B/T + C)$$

wherein
 A, B, C = the Antoine constants,
 T = temperature (° C.), and
 P = pressure (mm Hg).

The value of the Antoine constant can be read from a chemical handbook such as the Twelfth Edition of Lange's Handbook of Chemistry, edited by John A. Dean, published by McGraw-Hill, pages 10-28 to 10-54 and other editions of this book, as well as other chemical handbooks.

In the practice of the present invention, although the fluid contained in the bulb/chamber combinations of the dT cell can be a material which remains gaseous throughout the entire temperature range to which it is exposed, in general, the fluid is advantageously a liquid exhibiting a vapor pressure at the encountered temperatures.

For most accurate determination of temperature differences, a wide variation in the vapor pressure of the liquid with small differences in temperature at the encountered temperatures is desired. In addition, the vapor pressure exhibited by the liquid employed in the dT cell advantageously varies relatively linearly with temperature over the temperature range to be measured. Specifically, by reference to FIG. 5, the difference in the vapor pressure exhibited by a liquid for a specific difference in temperature will generally vary with changes in absolute temperature. For example, the vapor pressure in n-butane, as calculated using the Antoine equation, is, for the various temperatures specified below:

8° C. P=1041.0 mm Hg
23° C. P=1723.6 mm Hg
10° C. P=1117.3 mm Hg
25° C. P=1835.7 mm Hg

Referring to this table, the difference in vapor pressure, $\Delta P$, is found to vary for the same $\Delta T$ of 2° C. depending on the different temperatures involved. Specifically, at $T_1=10°$ C., $T_2=8°$ C. the difference in vapor pressure is 76.3 mm Hg whereas the difference in vapor pressure at $T_1=25°$ C. and $T_2=23°$ C. is 112.1 mm Hg. The accuracy of a pressure measuring device is typically from 0.1 to 0.7 percent of its span, i.e., the maximum pressure difference which can accurately be measured by the device. The absolute error is the product of this accuracy times the span, i.e., 0.001 to $0.007 \times 112.1 = 0.11$ to 0.78 mm Hg. At $T_1=25°$ C. and $T_2=23°$ C., this error corresponds to an absolute error in the temperature difference of 0.002° to 0.014° C. (i.e., from 0.1 to 0.7 percent error) whereas at $T_1=10°$ C. and $T_2=8°$ C. this error corresponds to an absolute error in the temperature difference of 0.003° to 0.020° C. or as much as 1.05 percent. As shown, at a specified temperature difference, using the same fluid in each bulb/chamber combination, the error depends on the differences in the pressure difference exhibited at the highest and lowest temperature to be encountered. This error becomes less as the difference in $\Delta P$ at the highest and lowest temperature is minimized, i.e., error is minimized as the vapor pressure difference exhibited by the liquid at a specific temperature difference approaches a constant value over the entire temperature range of interest.

In general, to create the maximum changes in pressure with small changes in temperature and the minimum changes in the differences of $\Delta P$ over the temperature range of interest, the fluid is preferably a liquid which exhibits a vapor pressure, the maximum vapor pressure not exceeding the design pressure of the dT cell, at the temperatures of interest. The liquid employed also advantageously has a boiling point less than or equal to the lowest temperature encountered by the dT cell during its operation and a critical temperature above the highest temperature to be encountered. In addition, the liquid will advantageously not decompose at the temperatures encountered.

The liquid most preferably employed will vary depending on the temperatures to which the fluid is to be exposed (which will generally vary from $-200°$ C. to 500° C.), the specific dT cell employed (e.g., the maximum and minimum difference in vapor pressure capable of being measured by the cell employed and the maximum expected pressure of the fluid), the desired accuracy and the like. In general, aliphatics and substituted aliphatics, such as the alkanes and alkenes of up to 12 carbon atoms (e.g., methane, ethane, ethylene, propane, propene, i-butane, n-butane, 1-butene, isobutene, i-hexane, n-hexane, 1-hexane, i-pentane, 1-pentene and the like); the alicyclics and substituted alicyclics (e.g., cyclohexane and the like); the alicyclics and substituted alicyclics (e.g., cyclohexane and the like) and water, particularly the aliphatic and substituted aliphatics and alicyclics and substituted alicyclics, are preferred for use in the dT cell for temperatures up to 350° C. Alkanes, alkenes and substituted alkenes or alkanes of up to six carbon atoms, particularly, alkenes such as ethylene, propylene, 1-butene, isobutylene or 1-hexene are preferred for use with temperatures of up to about 200° C., with methane, ethylene and propylene being preferred at temperatures from $-200°$ C. to $-20°$ C. Since the vapor pressures of methane, and ethylene and propylene at higher temperatures, e.g., above 100° to 150° C., can exceed the design pressure of the dT cell, these liquids are not advantageously employed at the higher temperatures and less volatile liquids are used. At higher temperatures, e.g., above 500° C., mercury or a liquid which at normal temperatures is a solid such as liquified sodium, are more preferably employed.

In general, the fluid in both bulb/chamber combinations of the dT will be the same. However, it is possible and sometimes advantageous to use different fluids in the bulb/chamber combinations of the dT cell.

The fluid is placed in the dT cell using conventional techniques for placing a fluid in a dVp cell. The liquid is placed in the bulb/chamber combination in an amount sufficient such that, at the temperatures of interest, the liquid never becomes completely vaporized, i.e., during operation the bulb/chamber combination always contains a liquid with its vapor.

To indicate the excellent accuracy obtained by the method and apparatus of the present invention, it is presumed that the temperature range to be encountered will vary from 5° to 25° C., that the actual temperature difference will be 2° C. and that n-butane is contained by both bulbs of the dT cell. The Antoine constants for n-butane are:

A=6.927
B=988.33
C=244.8

The vapor pressure of n-butane, as calculated using these constants and the hereinbefore described Antoine equation, is 1723.6 mm Hg for a temperature of 23° C. and 1835.7 mm Hg for a temperature of 25° C. Therefore, the $\Delta P$ for temperatures of 23° and 25° C. is (18.35.7−1723.6) mm Hg or 112.1 mm.

Using FIG. 4 for purposes of illustrating this example, it is presumed that the actual temperature of the fluid in the first bulb 1 is 23° C. and the actual temperature of the fluid in the second bulb 3 is 25° C. In measuring the actual temperature, the accuracy of a calibrated temperature sensor is typically at least 0.05° C. Therefore, the temperature measured by means of the sensor 12 can vary from 22.95° to 23.05° C., with 22.95° C. being selected as the measured temperature instead of 23° C. From the Antoine equation, the vapor pressure ($P_1$) calculated using $T_1=22.95°$ C. is 1720.9 mm Hg.

The calculated vapor pressure ($P_2$) in bulb 3 with the higher temperature will be $1720.9 + 112.2 = 1833$ mm Hg. The corresponding temperature ($T_1$) of the fluid in bulb 3 is then calculated to be 24.952° C. The calculated temperature difference then becomes 24.952−22.950=2.002° C. As compared with the actual temperature difference of 2° C., this leads to an error of only 0.1%.

Using the method of the present invention, a similarly small error is found for temperature differences of up to 12° C. when the temperature of the higher temperature fluid is 25° C. For example, an error of 0.12% was calculated at a temperature difference of 5° C. (i.e., $T_1=25°$ C., $T_2=20°$ C.); 0.11% at a temperature difference of 10° C. (i.e., $T_1=15°$ C., $T_2=25°$ C.) and 0.11% at a temperature difference of 12° C. (i.e., $T_1=13°$ C. and $T_2=25°$ C.).

The accuracy of the measurement of the pressure difference (i.e., the accuracy of the dT cell) will generally be from 0.1 to 0.7 percent. Therefore, the overall error in measurement of the temperature difference for $T_1=25°$ C. varies from 0.2 to 0.8% (i.e., 0.1% for the error due to the inaccuracy of the temperature sensor plus the 0.1% to 0.7% error due to the inaccuracy of the dT cell) which corresponds to 0.004° to 0.016° C. for a $\Delta T$ of 2° C., from 0.001° to 0.04° C. for a $\Delta T$ of 5° C. and from 0.02° to 0.081° C. at 10° C. and from 0.025° to 0.1° C. for a $\Delta T$ of 12° C. It is evident that, although the relative error varies very little, the absolute error in the temperature difference is dependent on the magnitude of the temperature difference to be measured.

If the temperature difference between the interiors of conduits 9 and 10 are determined by means of two temperature sensors, such as sensor 12, the total error, assuming an accuracy of each temperature sensor of 0.05° C., would be equal to: $2\times 0.05°$ C. or 0.1° C. This corresponds to a 5 percent error for a temperature difference of 2 degrees. Therefore, especially small differences in temperature are much more accurately measured to the method and apparatus according to the invention than by means of existing temperature sensors.

By this example, the apparatus and method of the present invention, for a temperature difference of 2° C. have been shown to give a result which is 6 to 25 times more accurate than prior systems. With a temperature difference of 12° C., the accuracy of the method according to the invention is at least equal to that which can be obtained by means of known differential temperature measurements.

The invention claimed is:

1. An apparatus for accurately measuring differences in temperature, which comprises:
   a first cell that comprises a bulb in fluid communication with a first chamber, the bulb and chamber contains a fluid ($F_1$), at least a portion of one wall of the first chamber defines a diaphragm, the side of said wall opposite to the first chamber provides at least a portion of the wall of a second chamber;
   a means for measuring the difference in pressure between the first and second chambers of the first cell;
   a second cell that comprises a bulb in fluid communication with a first chamber, the bulb and chamber contains a fluid ($F_2$), at least a portion of one wall of the first chamber defines a diaphragm, the side of said wall opposite to the first chamber provides at least a portion of the wall of a second chamber having a known pressure;
   a means for measuring the difference in pressure between the first and second chambers of the second cell; and
   the second chamber of the first cell is in fluid communication with the first chamber of the second cell.

2. A method for accurately measuring temperature differences between two environments using the apparatus of claim 1, and characterized by:
   measuring the difference in pressure ($\Delta P$), between a fluid ($F_2$) in the bulb and chamber of the second cell at a temperature ($T_2$) corresponding to the temperature of one environment and the known pressure ($P_k$) in the second chamber of the second cell;
   calculating the pressure $P_2$ of fluid $F_2$ from the known pressure $P_k$ and the pressure difference $\Delta P$;
   calculating the temperature $T_2$ corresponding to the temperature of the first environment;
   measuring the pressure difference $\Delta P$ between the fluid $F_2$ contained in the second chamber of the first cell and the fluid $F_1$ contained in the first chamber of the first cell;
   calculating the pressure $P_1$ of the fluid $F_1$ in the first cell from the measured pressure difference $\Delta P$ and the calculated value of pressure $P_2$;
   calculating the temperature $T_1$ of the fluid $F_1$ from the calculated value of pressure $P_1$, which temperature corresponds to the temperature of a second environment; and
   calculating the temperature difference $\Delta T$ from temperature $T_1$ and $T_2$.

* * * * *